United States Patent
Veis et al.

(10) Patent No.: US 11,780,166 B2
(45) Date of Patent: Oct. 10, 2023

(54) PREHEAT BUILD MATERIALS WITH PREHEATING SOURCES

(71) Applicant: HEWLETT-PACKARD DEVELOPMENT COMPANY, L.P., Spring, TX (US)

(72) Inventors: Alex Veis, Netanya (IL); Joaquim Brugue Garvi, Sant Cugat del Valles (ES); Esteve Comas Cespedes, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 110 days.

(21) Appl. No.: 16/608,320

(22) PCT Filed: Apr. 10, 2018

(86) PCT No.: PCT/US2018/026840
§ 371 (c)(1),
(2) Date: Oct. 25, 2019

(87) PCT Pub. No.: WO2019/199274
PCT Pub. Date: Oct. 17, 2019

(65) Prior Publication Data
US 2021/0039316 A1    Feb. 11, 2021

(51) Int. Cl.
*B29C 35/08* (2006.01)
*B29C 64/30* (2017.01)
(Continued)

(52) U.S. Cl.
CPC .............. *B29C 64/30* (2017.08); *B22F 10/00* (2021.01); *B29C 35/0805* (2013.01);
(Continued)

(58) Field of Classification Search
CPC ......... B33Y 40/00; B33Y 40/10; B33Y 50/02; B33Y 10/00; B33Y 30/00; B29C 64/393;
(Continued)

(56) References Cited

U.S. PATENT DOCUMENTS 5,329,295 A * 7/1994 Medin .................. B41J 11/0022
346/25
2007/0238056 A1 * 10/2007 Baumann ............... B33Y 10/00
430/325
(Continued)

FOREIGN PATENT DOCUMENTS

WO   WO2016048348 A1   3/2016
WO   WO2016068899 A1   5/2016
(Continued)

OTHER PUBLICATIONS

Laser Diode Area Melting for High Speed Additive Manufacturing of Metallic Components, 2017 (Per attached NPL).

*Primary Examiner* — Monica A Huson
*Assistant Examiner* — Kelsey C Grace
(74) *Attorney, Agent, or Firm* — Shook, Hardy & Bacon L.L.P.

(57) ABSTRACT

An example of an additive manufacturing system is disclosed. The example disclosed herein comprises a build material distributor, a preheating source, and a controller. The build material distributor is to form build material layers from an intended build material having a color. The preheating source is to emit energy at a wavelength related to the intended build material color so that at least a 40% of the energy is absorbed by the build material. The controller is to receive printing instructions to print a 3D object, wherein the printing instructions define an area to be fused in a build material layer. The controller is also to instruct the build material distributor to form the build material layer. The
(Continued)

controller is further to control the preheating source to emit energy to preheat a zone comprising the area to be fused.

16 Claims, 11 Drawing Sheets

(51) Int. Cl.
| | |
|---|---|
| *B33Y 10/00* | (2015.01) |
| *B33Y 50/02* | (2015.01) |
| *B29C 64/393* | (2017.01) |
| *B29C 64/165* | (2017.01) |
| *B33Y 40/10* | (2020.01) |
| *B22F 10/00* | (2021.01) |
| *B29K 77/00* | (2006.01) |

(52) U.S. Cl.
CPC .......... *B29C 64/165* (2017.08); *B29C 64/393* (2017.08); *B33Y 10/00* (2014.12); *B33Y 40/10* (2020.01); *B33Y 50/02* (2014.12); *B22F 2203/11* (2013.01); *B29C 2035/0827* (2013.01); *B29K 2077/00* (2013.01)

(58) Field of Classification Search
CPC . B29C 35/0805; B29C 64/165; B29C 64/295; B29C 64/30; B29C 2035/0827; B22F 10/00; B22F 2203/11; B29K 2077/00; B29K 2995/002; Y02P 10/25
See application file for complete search history.

(56) References Cited

U.S. PATENT DOCUMENTS

| | | |
|---|---|---|
| 2011/0195237 A1 | 8/2011 | Patel et al. |
| 2012/0188365 A1 | 7/2012 | Stork |
| 2016/0332376 A1* | 11/2016 | Ramirez Muela .... B29C 64/321 |
| 2020/0079010 A1* | 3/2020 | Zamorano ............ B29C 64/232 |

FOREIGN PATENT DOCUMENTS

| | | |
|---|---|---|
| WO | WO2016173100 A1 | 11/2016 |
| WO | WO2017019102 A1 | 2/2017 |
| WO | WO2017065796 A1 | 4/2017 |

\* cited by examiner

PREHEAT BUILD MATERIALS WITH PREHEATING SOURCES

BACKGROUND

Some three-dimensional printing systems apply a fusing agent over areas of successive layers of un-solidified build material, such as powdered or particulate-type build material, followed by exposure to fusing energy to selectively melt layers of a part of a three-dimensional object that is to be generated. The un-solidified powder may be preheated before the application of fusing agent.

BRIEF DESCRIPTION OF THE DRAWINGS

The present application may be more fully appreciated in connection with the following detailed description taken in conjunction with the accompanying drawings, in which like reference characters refer to like parts throughout and in which.

DETAILED DESCRIPTION

Figure 1:
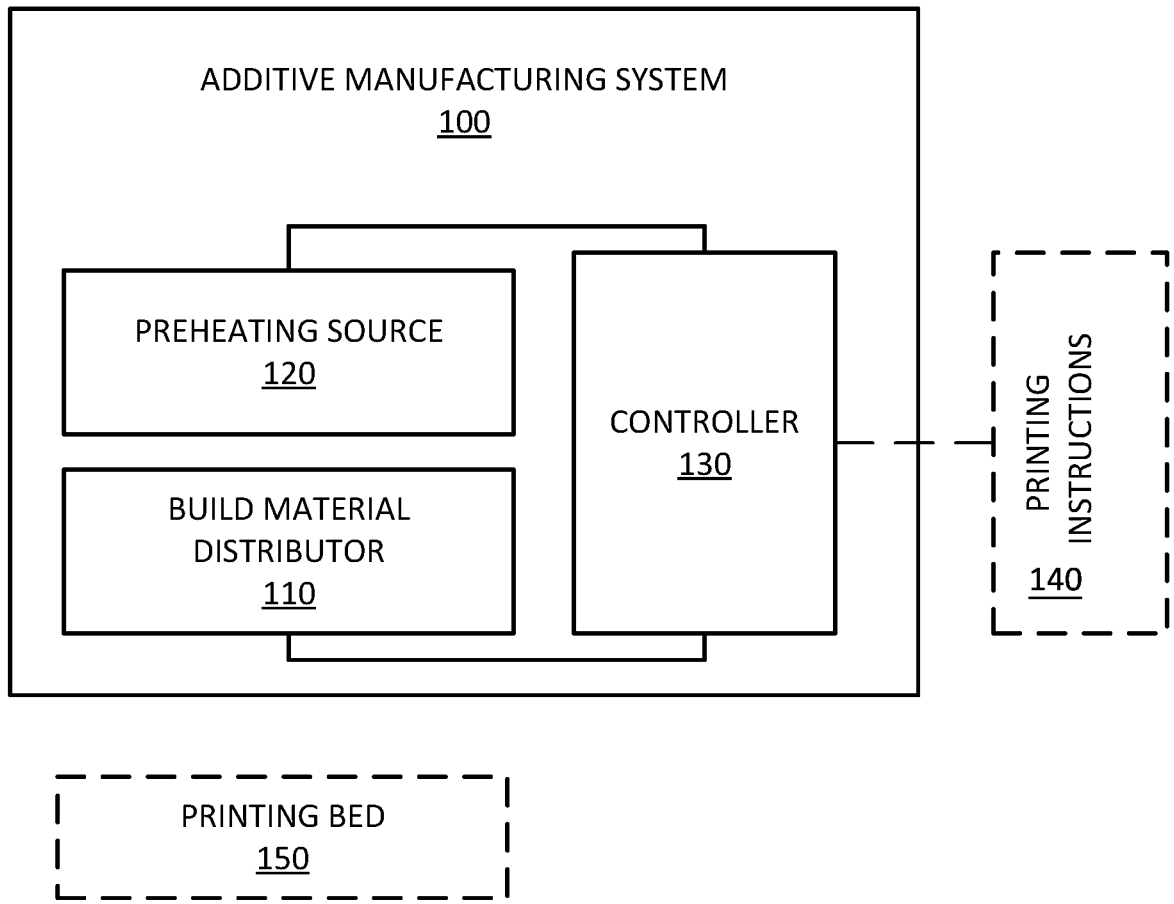
FIG. 1 is a block diagram illustrating an example of an additive manufacturing system to preheat build materials with preheating sources.

The following description is directed to various examples of the disclosure. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Three-dimensional printing may depend on application, for example by printing or jetting, of an energy absorbing fusing agent over areas of successive layers of un-solidified build material. According to one example, a suitable build material may be PA12 build material commercially known as V1R10A "HP PA12" available from HP Inc, Each layer may then be exposed to fusing energy to selectively melt layers of a part of a three-dimensional object that is to be generated.

One example of the present disclosure provides an additive manufacturing system that comprises a build material distributor to form build material layers from an intended build material having a color. The additive manufacturing system also comprises a preheating source to emit energy at a wavelength related to the intended build material color, so that at least 40% of the energy is absorbed by the build material The system further comprises a controller to receive printing instructions to print a three-dimensional (3D) object, wherein the printing instructions define an area to be fused in a build material layer; to instruct the build material distributor to form the build material layer; and to control the preheating source to emit energy to preheat a zone comprising the area to be fused. The purpose of preheating the build material zone comprising the area to be fused is to raise the temperature of said area of build material close to but below its melting point. The area from the build material layer other than the zone comprising the area to be fused may not absorb as much energy, and may therefore not heat up significantly.

Another example of the present disclosure provides a method comprising a plurality of operations to be performed. The method comprises receiving printing instructions to print a 3D object by using a build material layer, wherein the printing instructions define an area to be fused in the build material layer. The method also comprises forming the build material layer, by a build material distributor, wherein the build material has a color. The method further comprises preheating a zone comprising the area to be fused by a preheating source, by emitting energy at a wavelength related to the build material color, so that at least 40% of the energy is absorbed by the build material. The purpose of preheating the build material zone comprising the area to be fused is to raise the temperature of said area of build material close to but below its melting point. The method also comprises ejecting, by a fusing agent distributor, fusing agent to the build material layer based on the printing instructions. The method further comprises applying energy, for example by a fusing lamp, to the build material layer to fuse those portions of the layer on which fusing agent was deposited by raising the temperature of the dyed build material above its melting point. In the present disclosure, the fusing lamp and the preheating source are different and separate entities.

Another example of the present disclosure provides a non-transitory machine readable medium storing instructions executable by a processor. The non-transitory machine-readable medium comprises instructions to receive printing instructions to print a 3D object by using a build material layer, wherein the printing instructions define an area to be fused in the build material layer. The non-transitory machine readable medium also comprises instructions to form the build material layer, by a build material distributor, wherein the build material has a color. The non-transitory machine readable medium further comprises instructions to preheat a zone comprising the area to be fused by a preheating source, by emitting energy at a wavelength related to the build material color so that at least 40% of the energy is absorbed by the build material. The purpose of preheating the build material zone comprising the area to be fused is to raise the temperature of said area of build material a close to but below but near its melting point. The non-transitory machine readable medium also comprises instructions to eject, by a fusing distributor, fusing agent to the build material layer based on the printing instructions. The non-transitory machine readable medium further comprises instructions to heat, by a fusing lamp, the build material layer to fuse those portions of the layer on which fusing agent was deposited by raising the temperature of the dyed build material above its melting point. In the present disclosure, the fusing lamp and the preheating source are different and separate entities. Referring now to the figures, FIG. 1 is a block diagram illustrating an example of an additive manufacturing system 100 to preheat build materials with preheating sources. The system 100 comprises a build material distributor 110 and a preheating source. The build material distributor 110 may be understood as any mechanism (e.g., printing roller, printing wiper, etc.) to form build material layers from a build material having a color. In an example, the build material distributor 110 may form a build material layer on a printing bed 150. The printing bed 150 may be internal or removable from the additive manufacturing system 100 (e.g., the printing bed may not be present when the printer is shipped). The printing bed 150 may be a surface to receive build material from the build material distributor 110 in the form of, for example, build material layers having a generally uniform thickness. The generally uniform thickness may range from about 80 microns to about 120 microns, or bigger or smaller. The preheating source 120 is to emit energy at a wavelength so that at least 40% of the energy is absorbed by the build material. In the present disclosure, the term "a wavelength" may be understood as a single wavelength, or as a narrow band of wavelengths. In an example, the preheating source 120 is an array comprising one or more LED lights to emit energy at a wavelength, wherein each LED light may be individually controllable to emit energy at a wavelength. Other examples of preheating source 120 may be laser, laser diodes, laser arrays, and the like. More examples of the preheating source 120 are disclosed in FIG. 2A, and FIG. 2B. The system 100 further comprises a controller 130 in connection with the build material distributor 110 and the preheating source 120. The controller connection may be by means of a physical wire and/or wireless. The term "controller as used herein may include a series of" instructions encoded on a machine-readable storage medium and executable by a single processor or a plurality of processors. Additionally, or alternatively, a controller may include one or more hardware devices including electronic circuitry, for example a digital and/or analog application-specific integrated circuit (ASIC), for implementing the functionality described herein.

When illuminated, colored bodies reflect or absorb some of the illuminating wavelengths. Leveraging the color of a body to be illuminated (e.g., build material) in conjunction with the energy wavelength band from the light source (e.g., preheating source light) may lead to said illuminated body to absorb a bigger amount of the incoming energy. Precisely, bodies with colors that can absorb substantially the totality of a narrow band light source emissions may lead to high energy-efficient systems. This may substantially reduce the energy reflected (wasted) by the colored bodies and therefore enabling the design of energy-efficient heating systems, for example, an energy-efficient build material preheating system. In an example, a yellow body absorbs at least the 40% of a light source that emits energy at a wavelength comprised in the range defined from 450 nanometers (nm) to 495 nm, for example a blue light. Therefore, following this example, a system (e.g., system 100) comprising a build material layer having a yellow color, and a preheating source (e.g., preheating source 120) emitting blue light may be an energy-efficient system to pre-heat said yellow build material. In another example, an orange body absorbs at least the 40% of a light source that emits energy at a wavelength comprised in the range defined from 450 nanometers (nm) to 495 nm, for example a blue light. Therefore, following this example, a system (e.g., system 100) comprising a build material layer having an orange color, and a preheating source (e.g., preheating source 120) emitting blue light may be an energy-efficient system to pre-heat said orange build material. In yet another example, a white body (e.g., Titanium Dioxide) absorbs at least the 40% of a light source that emits energy at a wavelength of less than 400 nanometers (nm), for example Ultraviolet (UV) light. Therefore, following this example, a system (e.g., system 100) comprising a build material layer having a white color, and a preheating source (e.g., preheating source 120) emitting UV light may be a energy-efficient system to pre-heat said white build material. In the present disclosure the term "UV light" may be understood in its broad spectrum as it may comprise Ultraviolet A (UVA) wavelengths, ranging from about 315 nm to about 400 nm; Ultraviolet B (UVB) wavelengths, ranging from about 280 nm to about 315 nm; Ultraviolet C (UVC) wavelengths, ranging from about 100 nm to about 380 nm; and/or any other UV wavelength. Other combinations from build material color and preheating source energy wavelengths may be defined without departing from the scope of the present disclosure.

As an example, the preheating source is to emit energy at a wavelength related to the dyed build material color so that at least 40% of the energy is absorbed by the dyed build material. As an additional example, the preheating source is to emit energy at a wavelength related to the dyed build material color so that at least 50% of the energy is absorbed by the dyed build material. As an additional example, the preheating source is to emit energy at a wavelength related to the dyed build material color so that at least 60% of the energy is absorbed by the dyed build material. As an additional example, the preheating source is to emit energy at a wavelength related to the dyed build material color so that at least 90% of the energy is absorbed by the dyed build material. As an additional example, the preheating source is to emit energy at a wavelength related to the dyed build material color so that at least 98% of the energy is absorbed by the dyed build material.

As used herein, the term "about" is used to provide flexibility to a numerical range endpoint by providing that a given value may be, for example, an additional 15% more or an additional 15% less than the endpoints of the range. The degree of flexibility of this term can be dictated by the particular variable and would be within the knowledge of those skilled in the art to determine based on experience and the associated description herein.

The controller 130 is to receive printing instructions 140 to print a 3D object, wherein the printing instructions 140 define an area to be fused in a build material layer. The printing instructions 140 to print a 3D object may be derived from a 3D object model of a 3D object. An example of a 3D object model may be generated using a Computer Aided Design (CAD) application which is a tool that may be used to create precision drawings or technical illustrations. Another example of a 3D model may be a Computer Aided Manufacturing (CAM) application which is a tool that may be used to design products such as electronic circuit boards in computers and other devices. The 3D printing instructions may be instructions that, for example, describe at which locations on a powder bed drops of different print agents should be printed. Some examples of printing agents are fusing agents and detailing agents. A 3D object model may be defined in vector type format, and 2D rasterized images may be generated from this each representing slices of the object model. Each slice may then be processed to determine how printing agents should be printed to generate a layer of an object corresponding to the slice. The 3D printing instructions 140 define the 3D object to print by, for example, defining the plurality of slices of said object to be generated. Each slice may determine a cross-sectional area and/or a cross-sectional shape of the 3D object to be produced by the additive manufacturing apparatus 100 and determines the print agents that should be printed thereon. The cross-sectional area and/or the cross-sectional shape, may be the areas to be fused, Therefore, a slice from the plurality of slices may define which sections of the build material layer may need to be fused to print the 3D object.

The controller 130 is to instruct the build material distributor to form the build material layer. The build material layer may be formed on top of the printing bed 150 and it is a layer comprised of build material. The build material may be an un-solidified powder that may be, for example, nylon powder. In one example, the build material has a yellow color. In another example, the build material has an orange color. In another example, the build material has white color. In yet another example, the build material powder particles may be of the same or different colors wherein said colors, upon illumination with a narrow band preheating source (e.g., preheating source 120), the colored particles absorb over 40% of the energy of the preheating source. These are examples and other build material colors may be used without departing from the scope of the present disclosure.

The controller 130 is to control the preheating source 120 to emit energy to preheat a zone comprising the area to be fused. The zone comprising the area to be fused comprises the total surface of the area to be fused and may further comprise an additional surface of the build material layer that is not to be fused. In the present disclosure the preheating stage may be understood as heating the build material layer, by for example preheating source 120 irradiation, up to the point that the build material temperature is close but below the melting point of the build material. The controller 130 is to control the preheating source 120 to irradiate energy at specific zones comprising the areas to be fused previously defined by the printing instructions 140 of a 3D object. A plurality of examples of the zone comprising the area to be fused are disclosed in further detail in FIG. 3A-3D.

Figure 2A:
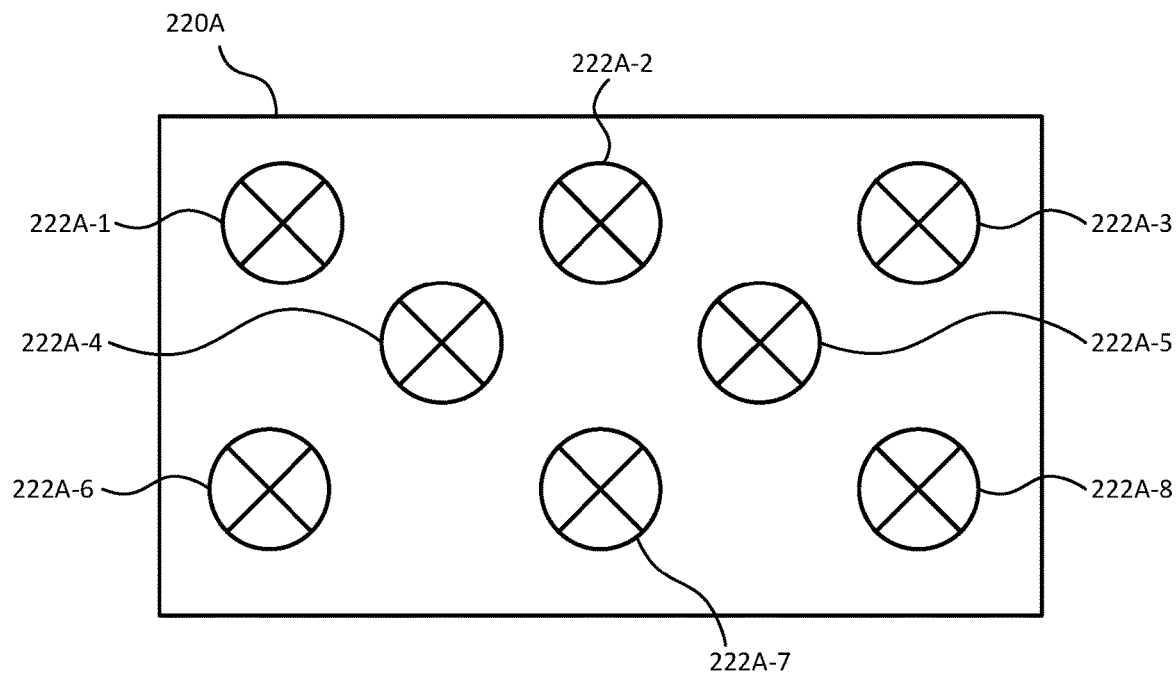
FIG. 2A is a block diagram illustrating an example of a preheating source.
Figure 2B:
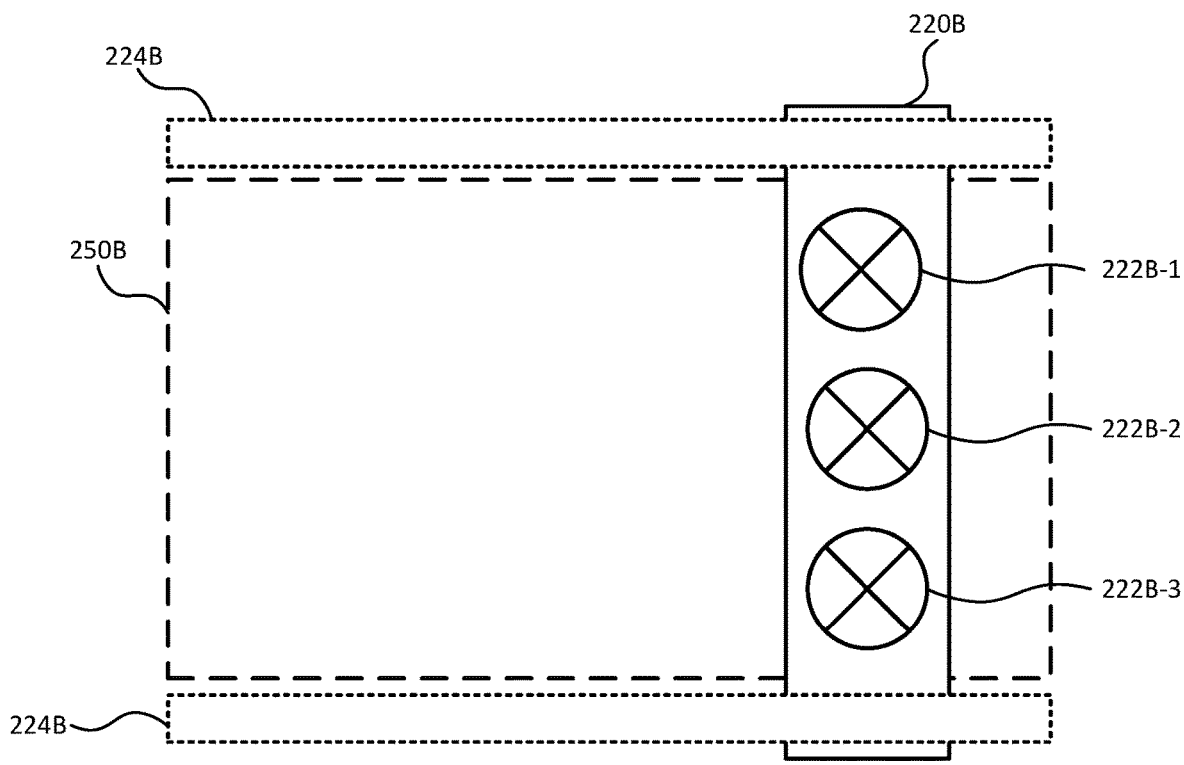
FIG. 2B is a block diagram illustrating another example of a preheating source.

FIG. 2A-2B illustrate examples of preheating sources. FIG. 2A is a block diagram illustrating an example of a preheating source according to an implementation. The preheating source may be a LED array 220A. The LED array 220A may be the same as or similar to the preheating source 120 from FIG. 1. The LED array 220A is a two-dimensional (2D) static array and comprises a plurality of LEDs therein. In the example, the LED array 220A comprises a first LED 222A-1, a second LED 222A-2, a third LED 222A-3, a fourth LED 222A-4, a fifth LED 222A-5, a sixth LED 222A-6, a seventh LED 222A-7, and an eighth LED 222A-8. The eight LEDs from the LED array 220A may be referred hereinafter as the plurality of LEDs (222A-1-222A-8). This is an example, and arrays comprising more or less LEDs can be derived therefrom without departing from the scope of the present disclosure. The plurality of LEDs from the LED array 220A are to emit energy that spans substantially the full width and length of the build material layer and are controllable to emit energy to the one or more areas to be fused. In the example, the plurality of LEDs are installed on the surface of the LED array 220A, however other layouts can be derived therefrom. In an example, the LED array 220A may be located in a substantially parallel position at a distance from about 15 millimeters to about 300 millimeters from the printing bed (e.g., printing bed 150 from FIG. 1). Precisely, the distance may depend on the light optics and the place in the system where the lights are located.

In an example, one LED from the plurality of LEDs (222A-1-222A-8) may be a blue LED, wherein the blue LED has a wavelength comprised in the range defined from about 450 nm to about 495 nm. In another example, each LED from the plurality of LEDs may be a blue LED, wherein the blue LED has a wavelength comprised in the range defined from about 450 nm to about 495 nm. In another example, one LED from the plurality of LEDs (222A-1-222A-8) may be a UV LED, wherein the UV LED has a wavelength of less than 400 nm. In yet another example, each LED from the plurality of LEDs may be a UV LED, wherein the UV LED has a wavelength of less than about 400 nm. These are examples and other LED colors, and/or LED color combinations, may be used without departing from the scope of the present disclosure.

A controller (e.g., controller 130 from FIG. 1) may control the plurality of LEDs (222A-1-222A-8) to emit energy to preheat a zone comprising the area to be fused. In one example, the area to be fused may be the area below the top right quadrant of the LED array 220A, then the controller may activate the LEDs that can irradiate said area, for example the second LED 222A-2, the third LED 222A-3, and the fifth LED 222A-5. In another example, the area to be fused may be the area below the central area of the LED array 220A, then the controller may activate the LEDs that can irradiate said area to be fused, for example the second LED 222A-2, the fourth LED 222A-4, the fifth LED 222A-5, and the seventh LED 222A-7. In an example, the controller may also select a certain LED beam angle from an LED from the plurality of LEDs (222A-1-222A-8), to cause said LED to illuminate a specific portion of the powder bed (e.g., powder bed 150 from FIG. 1). These are examples, and more examples can be derived therefrom.

FIG. 2B is a block diagram illustrating another example of a preheating source. The preheating source may be a LED array 220B. The LED array 220B may be the same as, or similar to, the preheating source 120 from FIG. 1. In an example, the LED array 220B is a one-dimensional (1D) array and comprises a plurality of offset LEDs therein. In another example, the LED array 220B is a 2D array and comprises a plurality of offset LEDs therein. In the example, the LED array 220B comprises a first LED 222B-1, a second LED 222B-2, and a third LED 222B-3. The three LEDs from the LED array 220B may be referred hereinafter as the plurality of LEDs (222B-1-222B-3). This is an example, and arrays comprising more or less LEDs can be derived therefrom without departing from the scope of the present disclosure. The plurality of LEDs from the LED array 220B are to emit energy that spans substantially the full width of the build material layer on the printing bed 250B and are controllable to emit energy to the one or more areas to be fused. The LED array 220B may be movable along the length of the build material layer on the printing bed 250B by moving means 224B. The moving means 224B may be any mechanism that allows the LED array 220B to move along the length of the build material layer on the printing bed 250B in a controlled manner. In an example, the moving means 224B may comprise a guide and an engine, wherein the LED array 220B is movable through the guide and the engine controls said movement based on the instructions of a controller (e.g., controller 130 from FIG. 1). Other examples of moving mean, such as a movable carriage, may be used without departing from the scope of the disclosure. In the example, the plurality of LEDs (222B-1-222B-3) are placed throughout the length of the LED array 220B, however other layouts can be derived therefrom. In an example, the LED array 220B may be located in a substantially parallel position at a distance from about 15 millimeters to about 300 millimeters from the printing bed (e.g., printing bed 150 from FIG. 1). Precisely, the distance may depend on the light optics and the place in the system where the lights are located.

In one example, one LED from the plurality of LEDs (222B-1-222B-3) may be a blue LED light, wherein the blue LED has a wavelength comprised in the range defined from about 450 nm to about 495 nm. In another example, each LED from the plurality of LEDs may be a blue LED light, wherein the blue LED has a wavelength comprised in the range defined from about 450 nm to about 495 nm. In another example, one LED from the plurality of LEDs (222B-1-222B-3) may be a UV LED, wherein the UV LED has a wavelength of less than 400 nm. In yet another example, each LED from the plurality of LEDs may be a UV LED, wherein the UV LED has a wavelength of less than about 400 nm. These are examples and other LED colors, and/or LED color combinations, may be used without departing from the scope of the present disclosure.

A controller (e.g., controller 130 from FIG. 1) may control the plurality of LEDs (222B-1-222B-3) to emit energy to preheat a zone comprising the area to be fused. The controller may also control the LED array 220B movement along the length of the build material layer on the printing bed 250B. The controller may activate the LEDs that can irradiate the zone comprising the area to be fused in a given time, leaving the other LEDs inactivated. In an example, the area to be fused may be the area below the top right quadrant of the LED array 220B and the LED array 220B may be in the starting position as drawn in FIG. 2B, then the controller may activate the first LED 222B-1 at the starting point and when the LED array 220B moves along the length of the printing bed 250B, the controller may deactivate the first LED 222B-1 when said LED does not irradiate the area to be fused anymore. In an example, the controller may also select a certain LED beam angle from an LED from the plurality of LEDs (222B-1-222B-3), to cause said LED to illuminate a specific portion of the powder bed (e.g., powder bed 150 from FIG. 1). This is an example, and more examples can be derived therefrom.

Figure 3A:
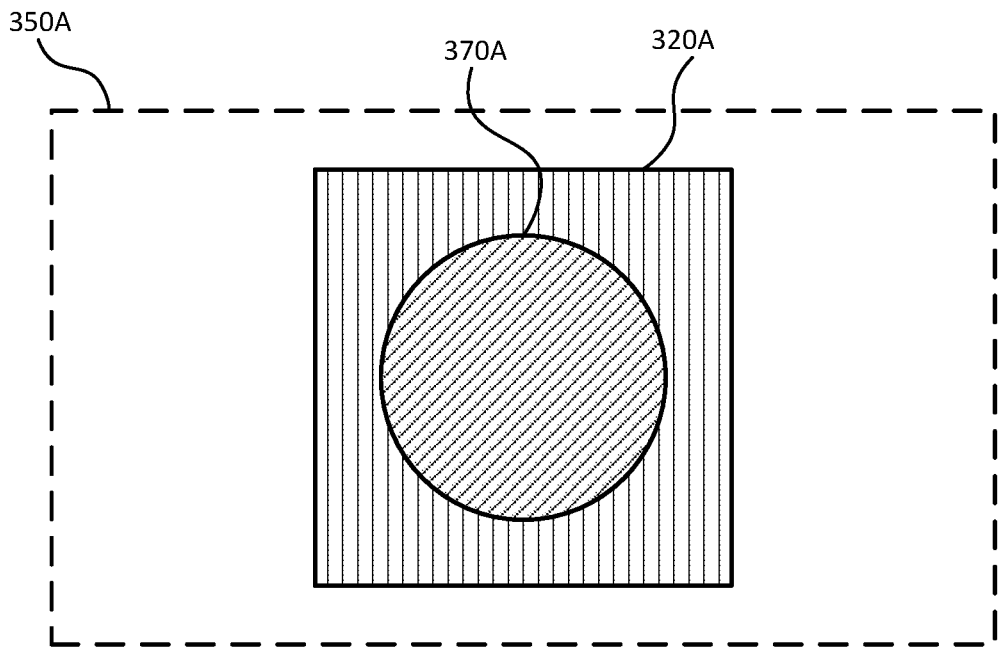
FIG. 3A is a block diagram illustrating an example of a zone comprising an area to be fused.

FIG. 3A-3D illustrate examples of a zone comprising an area to be fused. FIG. 3A is a block diagram illustrating an example of a zone comprising an area to be fused. The build material layer on the printing bed 350A comprises an area to be fused 370A and a preheating zone 320A comprising the area to be fused. The preheating zone 320A may be the same as, or similar to the zone comprising the area to be fused referred in FIG. 1, and may be defined by a controller based on 3D printing instructions. A preheating source (e.g., preheating source 120 from FIG. 1) is to emit energy to preheat the preheating zone 320A before the fusing operation. The area to be fused 370A may be defined by 3D printing instructions (e.g., printing instructions 140 from FIG. 1) and may be the area in which droplets of fusing agent may be ejected thereon. The printing bed 350A may be similar or the same as the printing bed 150 from FIG. 1. The preheating zone 320A comprises the area to be fused 370A and may also comprise part of the build material layer that is not to be fused. In the example, the preheating zone 320A has substantially a rectangular shape, wherein the area to be fused 370A is substantially placed in the middle. A preheating source (e.g., preheating source 120 from FIG. 1) may be controlled by a controller (e.g., controller 130 from FIG. 1) to emit energy to preheat the preheating zone comprising the area to be fused 320A.

Figure 3B:
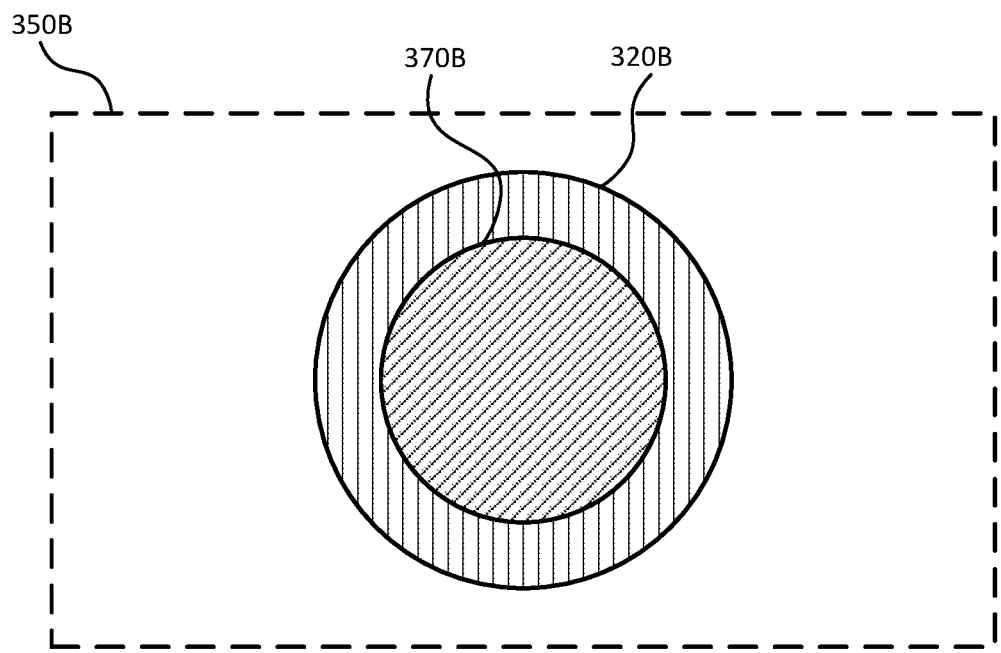
FIG. 3B is a block diagram illustrating another example of a zone comprising an area to be fused.

FIG. 3B is a block diagram illustrating another example of a zone comprising an area to be fused. The build material layer on the printing bed 350B comprises an area to be fused 370B and a preheating zone 320B comprising the area to be fused. The preheating zone 320B may be the same as, or similar to the zone comprising the area to be fused referred in FIG. 1, and may be defined by a controller based on 3D printing instructions. A preheating source (e.g., preheating source 120 from FIG. 1) is to emit energy to preheat the preheating zone 320B before the fusing operation. The area to be fused 370B may be defined by 3D printing instructions (e.g., printing instructions 140 from FIG. 1) and may be the area in which droplets of fusing agent may be ejected thereon. The printing bed 350B may be similar or the same as the printing bed 150 from FIG. 1. The preheating zone 320B comprises the area to be fused 370B and may also comprise part of the build material layer that is not to be fused. In the example, the preheating zone 320B has a similar shape as the area to be fused 370B but extended (covering a greater surface), wherein the area to be fused 370A is substantially placed in the middle. In some implementations, the preheating zone 320B may have coarsely pixelated shape depending on the heating precision of the preheating source beam. The extension of the preheating zone 320B with respect to the area to be fused 370B may vary depending on the example. In an example the preheating zone 320B extends by a predetermined distance around the perimeter of the area to be fused 370B, In another example, the preheating zone 320B may not extend the area to be fused 370B, therefore the preheating zone 320B, and the area to be fused 370B being substantially covering the same area, More examples can be derived without departing from the scope of the present disclosure. A preheating source (e.g., preheating source 120 from FIG. 1) may be controlled by a controller (e.g., controller 130 from FIG. 1) to emit energy to preheat the preheating zone comprising the area to be fused 320B.

Figure 3C:
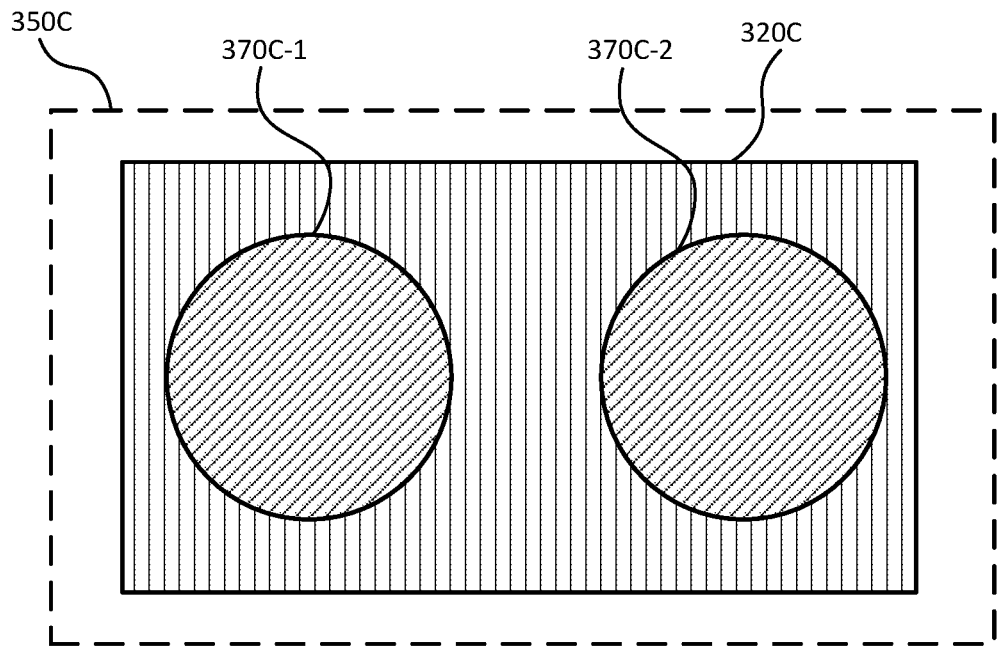
FIG. 3C is a block diagram illustrating another example of a zone comprising an area to be fused.

FIG. 3C is a block diagram illustrating another example of a zone comprising an area to be fused. The build material layer on the printing bed 350C comprises a first area to be fused 370C-1 and a second area to be fused 370C-2 and a single preheating zone 320C comprising the first area to be fused 370C-1 and the second area to be fused 370C-2. The preheating zone 320C may be the same as, or similar to the zone comprising the area to be fused referred in FIG. 1, and may be defined by a controller based on 3D printing instructions. A preheating source (e.g., preheating source 120 from FIG. 1) is to emit energy to preheat the preheating zone 320A before the fusing operation. The first area to be fused 370C-1 and the second area to be fused 370C-2 may be defined by 3D printing instructions (e.g., printing instructions 140 from FIG. 1) and may be the area in which droplets of fusing agent may be ejected thereon. The printing bed 350C may be similar or the same as the printing bed 150 from FIG. 1, The preheating zone 320C comprises the first area to be fused 370C-1 and the second area to be fused 370C-2; and may also comprise part of the build material layer that is not to be fused. In the example, the preheating zone 320C has substantially a rectangular shape, wherein the area to be fused 370C-1 is substantially placed in the middle of a first half of the preheating zone 320C, and the second area to be fused 370C-2 is substantially placed in the middle of a second half of the preheating zone 320C. A preheating source (e.g., preheating source 120 from FIG. 1) may be controlled by a controller (e.g., controller 130 from FIG. 1) to emit energy to preheat the preheating zone comprising the area to be fused 320A.

Figure 3D:
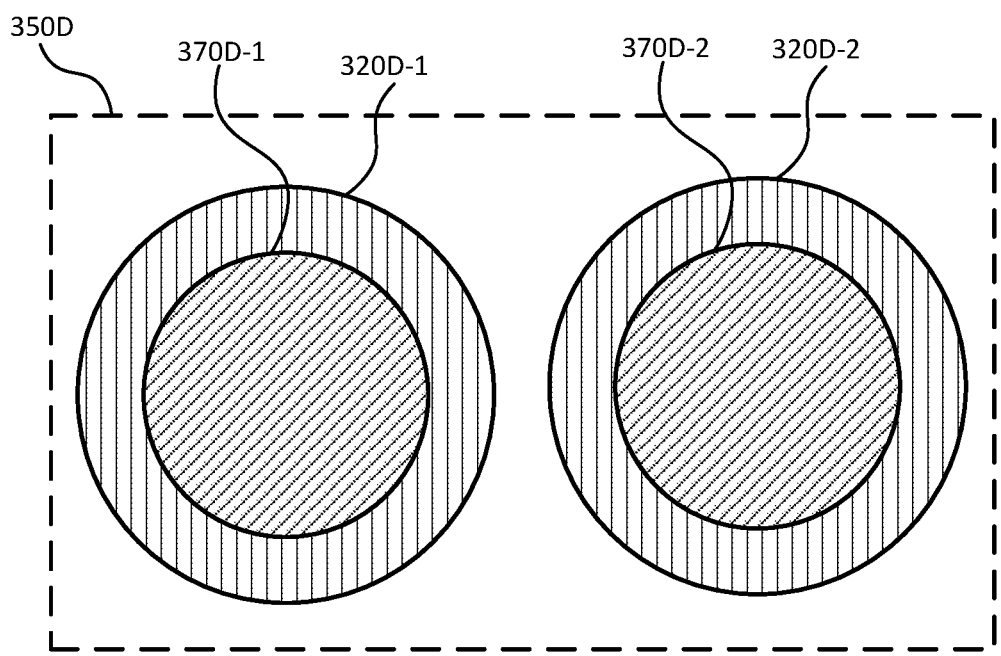
FIG. 3D is a block diagram illustrating another example of a zone comprising an area to be fused.

FIG. 3D is a block diagram illustrating another example of a zone comprising an area to be fused. The build material layer on the printing bed 350D comprises a first area to be fused 370D-1, a second area to be fused 370D-2, a first preheating zone 320D-1 comprising the first area to be fused, and a second preheating zone 320D-2 comprising the second area to be fused. The first preheating zone 320D-1 and the second preheating zone 320D-2 may be the same as, or similar to the zone comprising the area to be fused referred in FIG. 1, and may be defined by a controller based on 3D printing instructions. A preheating source (e.g., preheating source 120 from FIG. 1) is to emit energy to preheat the preheating zone 320B before the fusing operation. The first area to be fused 370D-1 and the second area to be fused 370D-2 may be defined by 3D printing instructions (e.g., printing instructions 140 from FIG. 1) and may be the area in which droplets of fusing agent may be ejected thereon. The printing bed 350D may be similar or the same as the printing bed 150 from FIG. 1. The first preheating 320D-1 comprises the first area to be fused 370D-1 and may also comprise part of the build material layer that is not to be fused. Likewise, the second preheating zone 320D-2 comprises the second area to be fused 370D-2 and may also comprise part of the build material layer that is not to be fused. In the example, the first preheating zone 320D-1 has a similar shape as the area to be fused 370D-1 but extended (covering a greater surface), wherein the first area to be fused 370D-1 is substantially placed in the middle. In some implementations, the preheating zone 320D-1 may have coarsely pixelated shape depending on the heating precision of the preheating source beam. The extension of the first preheating zone 320D-1 with respect to the first area to be fused 370D-1 may vary depending on the example. In an example, the first preheating zone 320D-1 extends by a predetermined distance around the perimeter of the first area to be fused 370D-1. In another example, the first preheating 320D-1 may not extend the first area to be fused 370D-1, therefore the first preheating zone 320D-1, and the first area to be fused 370D-1 being substantially covering the same area. Similar description may apply to the second preheating zone 320D-2, and the second area to be fused 370D-2. More examples can be derived without departing from the scope of the present disclosure. A preheating source (e.g., preheating source 120 from FIG. 1) may be controlled by a controller (e.g., controller 130 from FIG. 1) to emit energy to preheat the first preheating zone comprising the first area to be fused 320D-1, and the second preheating zone comprising the second area to be fused 320D-2 as separate entities.

Figure 4:
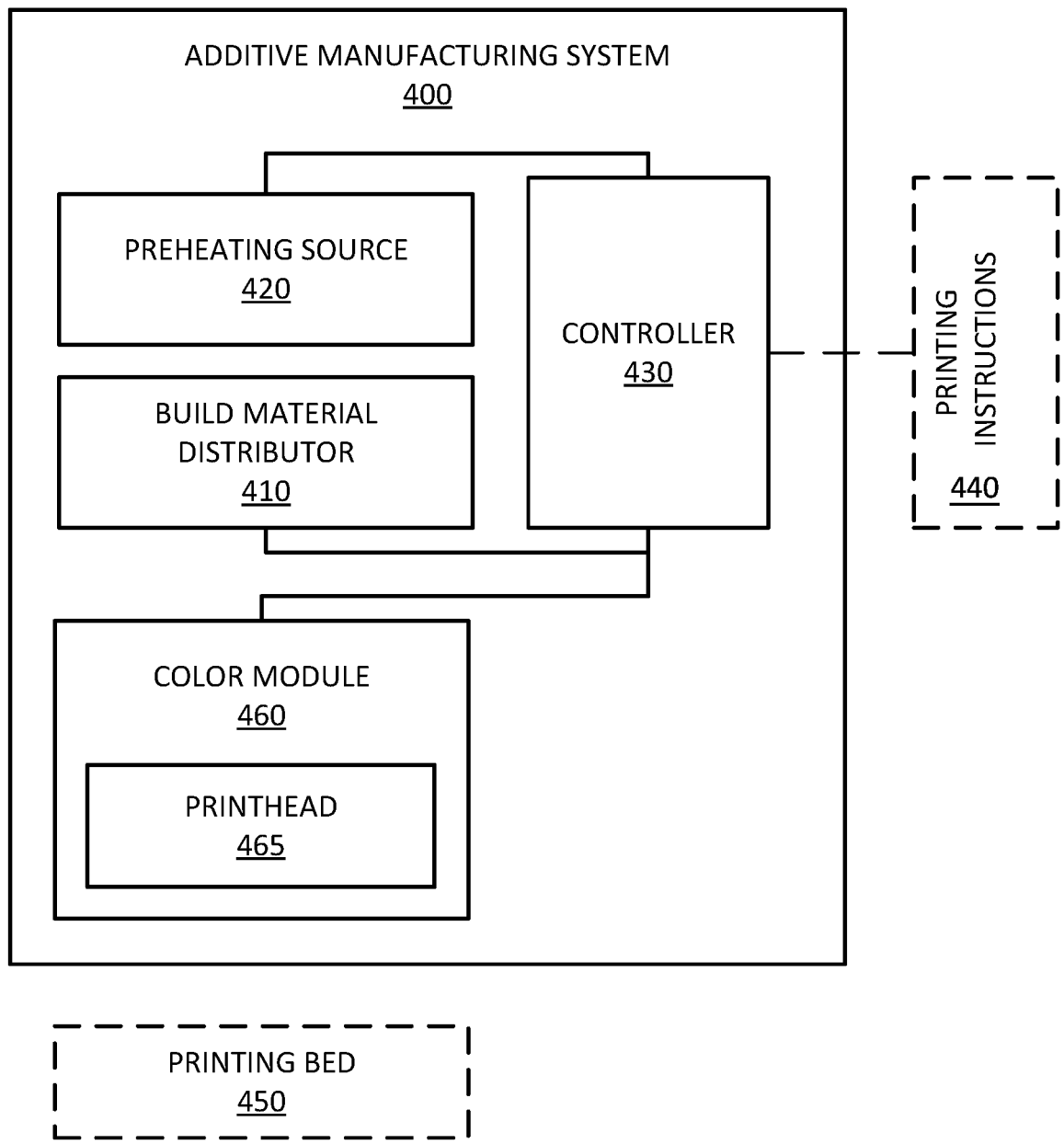
FIG. 4 is a block diagram illustrating another example of an additive manufacturing system to preheat build materials with preheating sources.

FIG. 4 is a block diagram illustrating an additive manufacturing system 400 to preheat build materials with preheating sources according to an example. The system 400 comprises a build material distributor 410, a preheating source 420, and a color module 460. The build material distributor 410 may be the same as, or similar to the build material distributor 110 from FIG. 1. The preheating source 420 may be the same as or similar to the preheating source 120 from FIG. 1. The build material distributor 410 may be understood as any mechanism (e.g., printing roller, printing wiper, etc.) to form build material layers from a build material having a color that absorbs less than 40% of the wavelength energy emitted by the preheating source 420, wherein the preheating source 420 illuminates the build material color. The build material color may be different from the build material color of the build material layer of FIG. 1. In an example, the build material distributor 410 may form a build material layer on a printing bed 450. The printing bed 450 may be internal or removable from the additive manufacturing system 400 (e.g., the printing bed may not be present when the printer is shipped). The printing bed 150, may be a surface to receive build material from the build material distributor 410 in the form of, for example, build material layers having a generally uniform thickness. The generally uniform thickness may range from about 80 microns to about 120 microns, or bigger or smaller. The preheating source 420 is to emit energy at a wavelength so that at least 40% of the energy is absorbed by the build material. The build material bed 450 may be the same as or similar to the building printing bed 150 from FIG. 1. The color module 460 is to eject a composition that is different from the fusing agent that dyes the build material layer in a color that absorbs at least the 40% if the wavelength energy emitted by the preheating source 420, wherein the preheating source 420 illuminates the build material color. The color of the build material layer after the dyeing operation of the color module 460 may be similar or the same as the build material layer color of FIG. 1. In an example, the composition ejected by the color module may be printing liquid composition that may comprise, for example, a dye or pigments. In an example, the preheating source 420 is an array comprising one or more LED lights to emit energy at a wavelength, wherein each LED light may be individually controllable to emit energy at a wavelength. Other examples of preheating source 420 may be laser, laser diodes, laser arrays, and the like. The system 400 further comprises a controller 430 in connection with the build material distributor 410, the preheating source 420, and the color module 460. The controller 430 may receive printing instructions 440 and may have the same functionality as the controller 130 that receives the printing instructions 140 from FIG. 1. The controller connection may be by means of a physical wire and/or wireless. The term "controller" as used herein may include a series of instructions encoded on a machine-readable storage medium and executable by a single processor or a plurality of processors. Additionally, or alternatively, a controller may include one or more hardware devices including electronic circuitry, for example a digital and/or analog application-specific integrated circuit (ASIC), for implementing the functionality described herein.

In an example, the color module 460 may dye the build material layer, for example in yellow color. In another example, the color module 460 may dye the build material layer in orange color. In another example, the color module 460 may dye the build material layer in white color. In yet another example, the color module 460 may dye the build material powder particles in different colors wherein said colors, upon illumination with a narrow band preheating source (e.g., preheating source 420), the colored particles absorb over 40% of the preheating source. These are examples and other build material color dyes may be used without departing from the scope of the present disclosure.

The additive manufacturing system 400 enables using non-dyed build material as raw material, and then dye said non-dyed build material in the most appropriate color to be energy-efficient preheated, and therefore being compliant with the teaching of the present disclosure.

The color module 460 may eject a composition that dyes the build material layer in a color that absorbs at least a 40% of the wavelengths energy, upon preheating source 420 illumination. For example, the color module 460 may comprise one or more printheads 465 to apply the composition to the build material layer.

Figure 5:
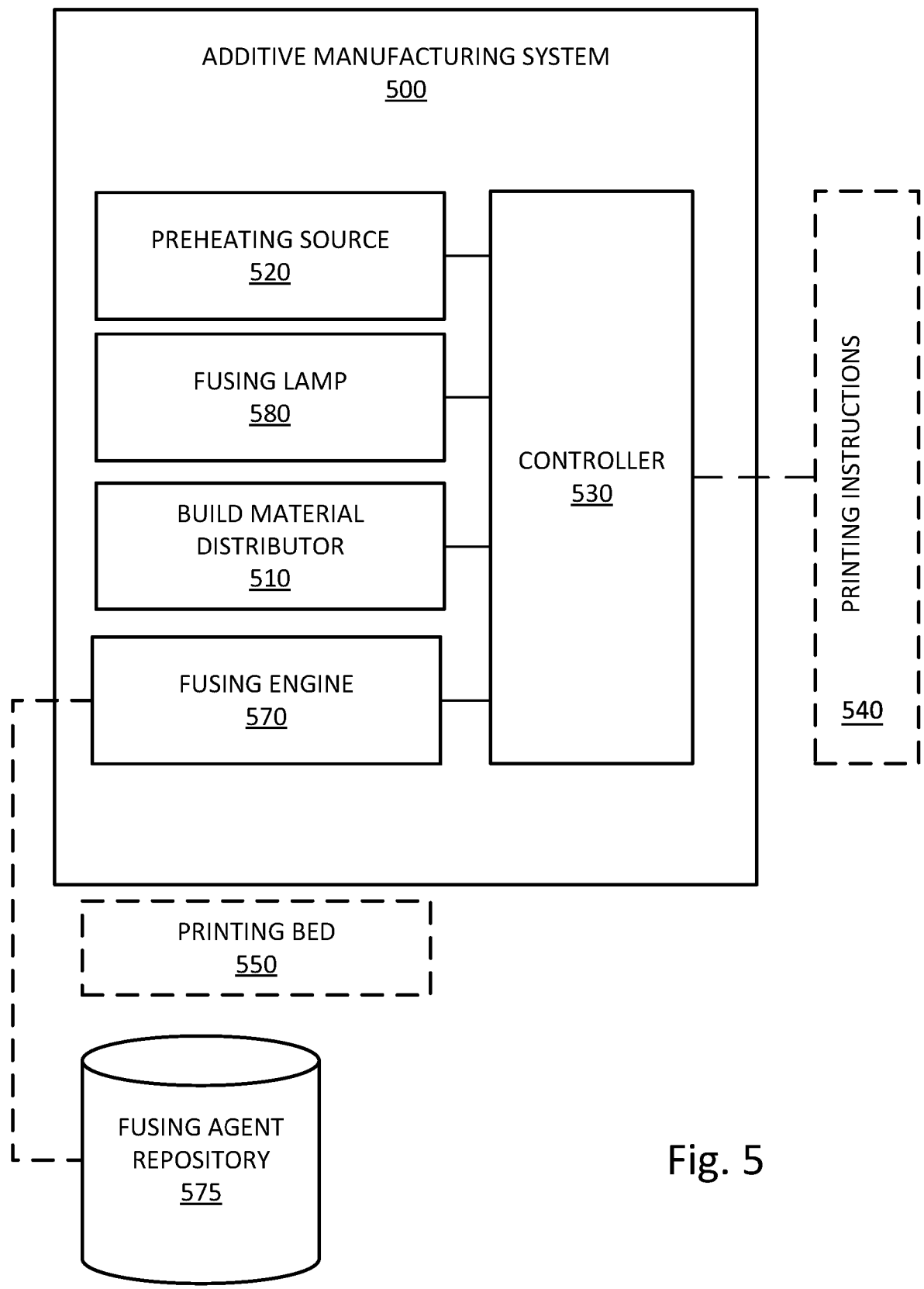
FIG. 5 is a block diagram illustrating another example of an additive manufacturing system to preheat build materials with preheating sources.

FIG. 5 is a block diagram illustrating another example of an additive manufacturing system 500 to preheat build materials with preheating sources according to an example. The system 500 comprises a build material distributor 510, a preheating source 520, a fusing distributor 570, and a fusing lamp 580. The build material distributor 510 may be the same as or similar to the build material distributor 110 from FIG. 1. The preheating source 520 may be the same as or similar to the preheating source 120 from FIG. 1. The build material distributor 510 may be understood as any mechanism (e.g., printing roller, printing wiper, etc.) to form build material layers from a build material having a color. In an example, the build material distributor 510 may form a build material layer on a printing bed 550. The printing bed 550 may be internal or removable from the additive manufacturing system 500 (e.g., the printing bed may not be present when the printer is shipped). The printing bed 550 may be a surface to receive build material from the build material distributor 510 in the form of, for example, build material layers having a generally uniform thickness. The generally uniform thickness may range from about 80 microns to about 120 microns, or bigger or smaller. The preheating source 520 is to emit energy at a wavelength related to the build material color so that at least 40% of the energy is absorbed by the build material. The build material bed 550 may be the same as or similar to the building printing bed 150 from FIG. 1. The preheating source 520 may be an array comprising one or more LED lights to emit energy. The fusing distributor 570 is to eject fusing agent to the build material layer. The fusing lamp 580 is to heat the build material layer. The fusing lamp 580 may be a separate entity as the preheating source 520. As an example, a fusing lamp may be made of Tungsten and may comprise resistive heaters that may irradiate the printing bed 550 by a wide band of energy wavelengths. The system 500 further comprises a controller 530 in connection with the build material distributor 510, the preheating source 520, the fusing distributor 570, and the fusing lamp 580. The controller 530 may receive printing instructions 540 and may have the same functionality as the controller 130 that receives the printing instructions 140 from FIG. 1. The controller connection may be by means of a physical wire and/or wireless. The term "controller" as used herein may include a series of instructions encoded on a machine-readable storage medium and executable by a single processor or a plurality of processors. Additionally, or alternatively, a controller may include one or more hardware devices including electronic circuitry, for example a digital and/or analog application-specific integrated circuit (ASIC), for implementing the functionality described herein.

The fusing agent is a composition that may be applied to the build material layer. In an example, the fusing agent may be a printing liquid composition. When a suitable amount of energy (e.g., energy irradiated by fusing lamp 580) is applied to the combination of build material and fusing agent, said energy may cause the combination of build material and fusing agent to heat up above the melting point and to fuse and solidify. The fusing agent may be stored in a fusing agent repository 575 connected to the fusing distributor 570. In the example, the fusing agent repository 575 is outside the additive manufacturing system 500, however other system examples may include the fusing agent repository 570.

According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc.

The controller 530 is to receive printing instructions 540 and derive the area to be fused in the build material layer therefrom. The controller 530 may instruct the build material distributor 510 to form the build material layer, and control the preheating source 520 to preheat the zone comprising the area to be fused. The controller 530 may further instruct the fusing distributor to eject fusing agent to the build material layer based on the printing instructions 540. The printing instructions 540 may define the areas to be fused, and the controller may instruct the fusing distributor to eject fusing agent to said areas to be fused on the build material layer. The controller 530 may also instruct the fusing lamp 680 to heat the build material layer to heat up above the melting point to fuse the combination of build material and fusing agent and solidify.

An example of fusing operation has been disclosed, however different fusing operations may be applied. For example, some alternative fusing processes may be Selective Laser Sintering (SLS), Selective Laser Melting (SLM) and/or Direct Metal Laser Sintering (DMLS), which are an additive manufacturing technique designed to use a high power-density laser to melt and fuse metallic powders together.

Figure 6:
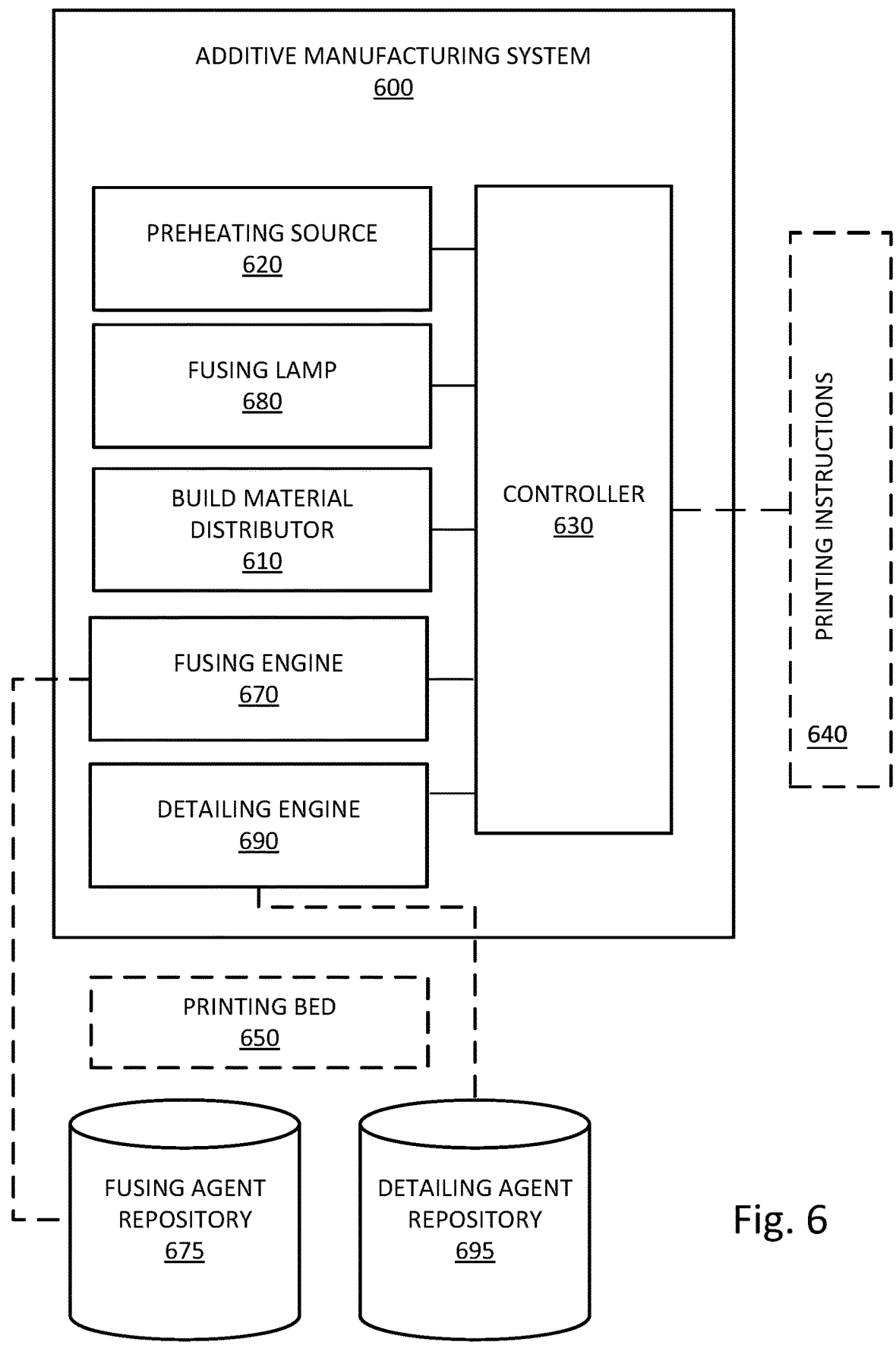
FIG. 6 is a block diagram illustrating another example of an additive manufacturing system to preheat build materials with preheating sources.

FIG. 6 is a block diagram illustrating another example of an additive manufacturing system 600 to preheat build materials with preheating sources according to an example. The system 600 comprises a build material distributor 610, an preheating source 620, a fusing distributor 670, a detailing engine 690, and a fusing lamp 680. The build material distributor 610 may be the same as or similar to the build material distributor 110 from FIG. 1, The preheating source 620 may be the same as or similar to the preheating source 120 from FIG. 1. The build material distributor 610 may be understood as any mechanism (e.g., printing roller, printing wiper, etc.) to form build material layers from a build material having a color. In an example, the build material distributor 610 may form a build material layer on a printing bed 650. The printing bed 650 may be internal or removable from the additive manufacturing system 600 (e.g., the printing bed may not be present when the printer is shipped). The printing bed 650 may be a surface to receive build material from the build material distributor 610 in the form of, for example, build material layers having a generally uniform thickness. The generally uniform thickness may range from about 80 microns to about 120 microns, or bigger or smaller. The preheating source 620 is to emit energy at a wavelength so that at least 40% of the energy is absorbed by the build material. The build material bed 650 may be the same as or similar to the building printing bed 150 from FIG. 1. The preheating source 620 may be an array comprising one or more LED lights to emit energy at a wavelength. The fusing distributor 670 is to eject fusing agent to the build material layer. The fusing distributor 670 may have the same functionality as the fusing distributor 570 from FIG. 5. The detailing engine 690 is to eject detailing agent to the build material layer. The fusing lamp 680 is to heat the build material layer to fuse those portions of the layer on which fusing agent was deposited by raising the temperature of the dyed build material above its melting point. The fusing lamp 680 may be a separate entity as the preheating source 620. As an example, a heating lamp may be made of Tungsten and may comprise resistive heaters that may irradiate the printing bed 650 by a wide band of energy wavelengths. The system 600 further comprises a controller 630 in connection with the build material distributor 610, the preheating source 620, the fusing distributor 670, the detailing agent 690, and the fusing lamp 680. The controller 630 may receive printing instructions 640 and may have the same functionality as the controller 130 that receives the printing instructions 140 from FIG. 1. The controller connection may be by means of a physical wire and/or wireless. The term "controller" as used herein may include a series of instructions encoded on a machine-readable storage medium and executable by a single processor or a plurality of processors, Additionally, or alternatively, a controller may include one or more hardware devices including electronic circuitry, for example a digital and/or analog application-specific integrated circuit (ASIC), for implementing the functionality described herein.

The fusing agent is a composition that may be applied to the build material layer. In an example, the fusing agent may be a printing liquid composition. When a suitable amount of energy (e.g., energy irradiated by fusing lamp 680) is applied to the combination of build material and fusing agent, said energy may cause the combination of build material and fusing agent to heat up above the melting point and to fuse and solidify. The detailing agent is another composition that may be applied to the build material layer before applying energy to fuse the build material and the fusing agent. The detailing agent may provide temperature control, for example, around the boundaries of areas printed with the fusing agent, or may modulate the effect of the fusing agent. If the amount of irradiation and temperature are not properly controlled, too much of the printed areas and surrounding un-solidified build material from the build material layer may melt, or the printed areas may not melt sufficiently. For example, when a printed area is selectively melted, smaller areas may tend to cool faster than larger areas, resulting in potentially weaker mechanical properties in the smaller areas. The detailing agent may include, for example, a clear liquid, or liquid of a single or different colors. According to one example, a suitable detailing agent may be a formulation commercially known as V1Q61A "HP detailing agent" available from HP Inc. The fusing agent may be stored in a fusing agent repository 675 connected to the fusing distributor 670. The detailing agent may be stored in a detailing agent repository 695 connected to the detailing engine 690.

In the example, the fusing agent repository 675 and the detailing agent repository 695 are outside the additive manufacturing system 600, however other system examples may include the fusing agent repository 675 and/or the detailing agent repository 695.

The controller 630 is to receive printing instructions 640 and derive the area to be fused in the build material layer therefrom. The controller 630 may instruct the build material distributor 610 to form the build material layer, and control the preheating source 520 to preheat the zone comprising the area to be fused. The controller 630 may further instruct the fusing distributor to eject fusing agent to the build material layer based on the printing instructions 640. The printing instructions 640 may define the areas to be fused, and the controller may instruct the fusing distributor 670 to eject fusing agent to said areas to be fused on the build material layer. The controller 630 may further instruct the detailing engine 690 to eject detailing agent to the build material layer based on the printing instructions 640. In an example, the detailing agent may be ejected in the boundaries of the fusing agent. The controller 630 may also instruct the fusing lamp 680 to heat the build material layer to heat up above the melting point to fuse the combination of build material and fusing agent and solidify.

An example fusing operation has been disclosed, however different fusing operations may be applied. For example, some alternative fusing processes may be Selective Laser Sintering (SLS), Selective Laser Melting (SLM) and/or Direct Metal Laser Sintering (DMLS), which are an additive manufacturing technique designed to use a high power-density laser to melt and fuse metallic powders together.

Figure 7:
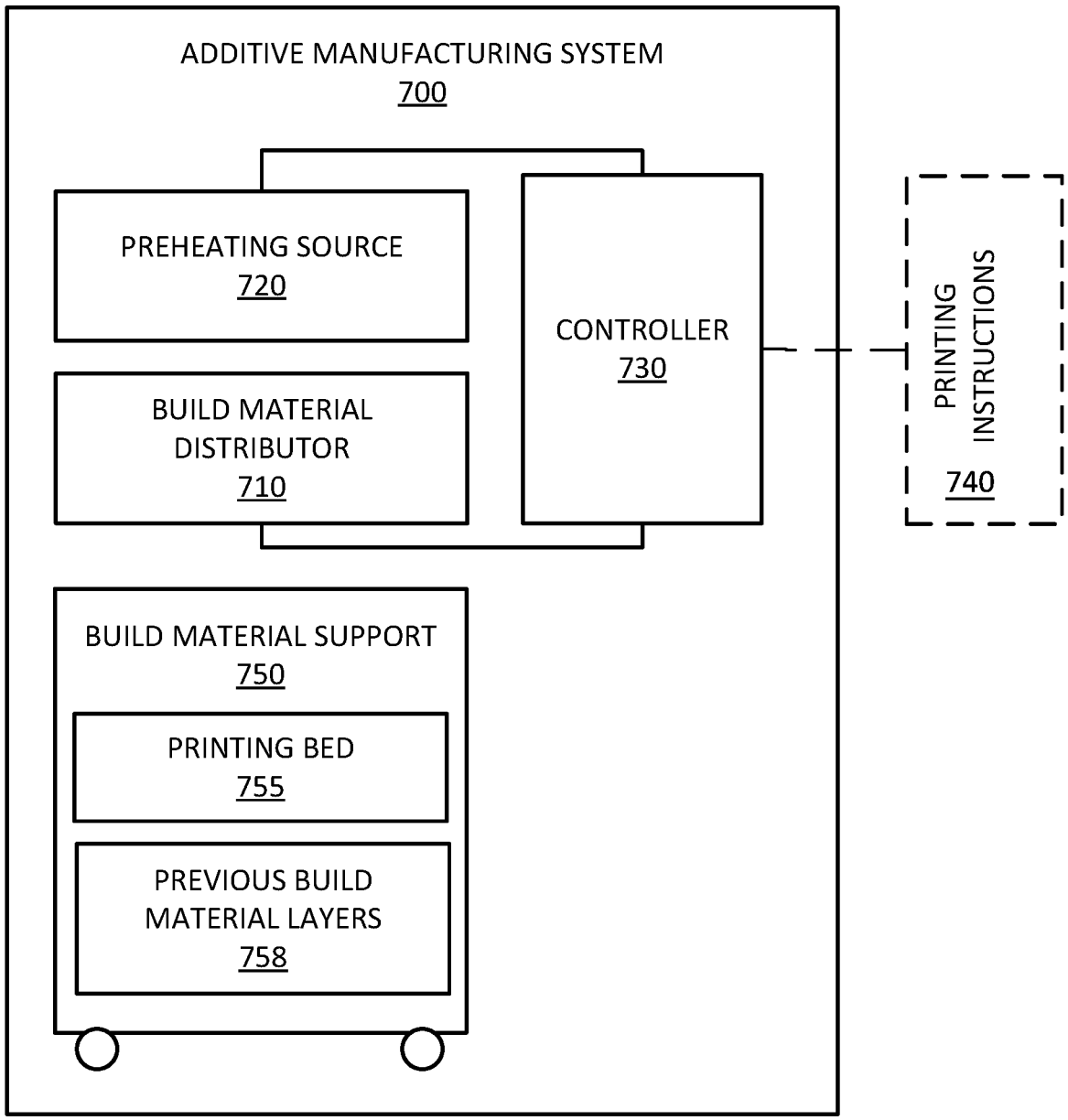
FIG. 7 is a block diagram illustrating another example of an additive manufacturing system to preheat build materials with preheating sources.

FIG. 7 is a block diagram illustrating another example of an additive manufacturing system 700 to preheat build materials with preheating sources according to an example. The system 700 comprises a build material distributor 710, a preheating source 720, and a build material support 750. The build material support 750 may comprise a printing bed 755. In the examples the additive manufacturing system 700 is in operation, the build material support 750 may further comprise the previously build material layers 758. The build material distributor 710 may be the same as or similar to the build material distributor 110 from FIG. 1. The preheating source 720 may be the same as or similar to the preheating source 120 from FIG. 1. The build material distributor 710 may be understood as any mechanism (e.g., printing roller, printing wiper, etc.) to form build material layers from a build material having a color with the. In an example, the build material distributor 710 may form a build material layer on the printing bed 755. The printing bed 755 may be a surface to receive build material from the build material distributor 710 in the form of, for example, build material layers having generally uniform thickness. The generally uniform thickness may range from about 80 microns to about 120 microns, or bigger or smaller. The preheating source 720 is to emit energy at a wavelength so that at least 40% of the energy is absorbed by the build material. The preheating source 720 may be an array comprising one or more LED lights to emit energy at a wavelength. The system 700 further comprises a controller 730 in connection with the build material distributor 710, and the preheating source 720. In some examples, the controller 730 may also be connected to the build material support 750. The controller 530 may receive printing instructions 740 and may have the same functionality as the controller 130 that receives the printing instructions 140 from FIG. 1. The controller connection may be by means of a physical wire and/or wireless. The term "controller" as used herein may include a series of instructions encoded on a machine-readable storage medium and executable by a single processor or a plurality of processors. Additionally, or alternatively, a controller may include one or more hardware devices including electronic circuitry, for example a digital and/or analog application-specific integrated circuit (ASIC), for implementing the functionality described herein.

The build material support 750 may be a modular device that may be installed in the additive manufacturing system 700. In one example, the build material support 750 may be permanently installed in the additive manufacturing system 700. In another example, the build material support 750 may be attached and detached from the additive manufacturing system 700 by means of a moving mechanism, for example, wheels installed under the bottom surface of the build material support 750. The build material support 750 comprises the printing bed 755 wherein the build material layer can be formed by the build material distributor 710. The build material support 750 may further comprise previously built material layers 758 wherein previously printed layers from the 3D object to be printed may be stored.

Figure 8:
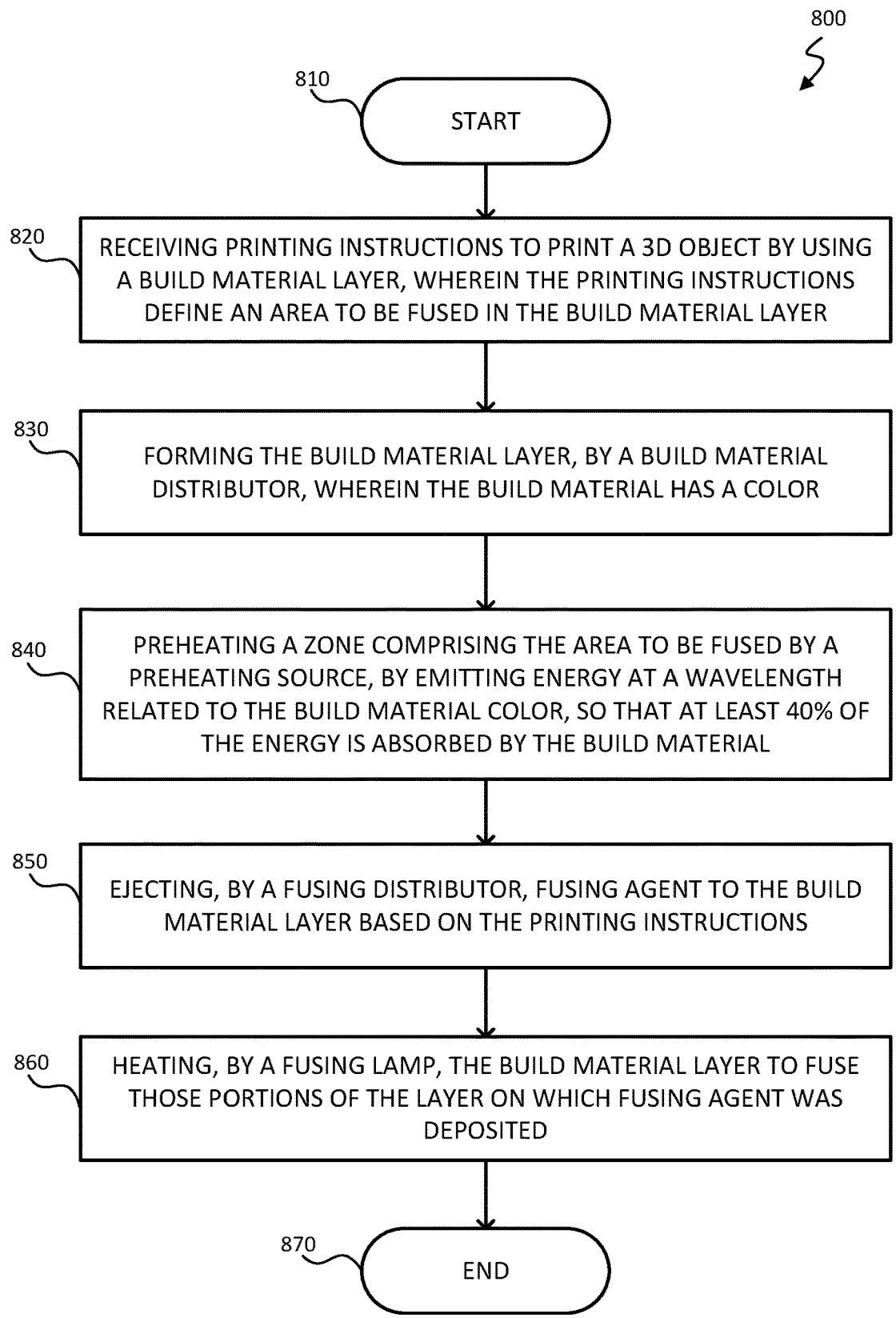
FIG. 8 is a flowchart of an example method for preheating build materials with preheating sources.

FIG. 8 is a flowchart of an example method 800 for preheating build materials with preheating sources according to an example. Method 800 may be described below as being executed or performed by an apparatus, such as apparatus 100 of FIG. 1. Various other suitable systems may be used as well, such as, for example apparatus 400 of FIG. 4, apparatus 500 of FIG. 5, apparatus 600 from FIG. 6, and apparatus 700 from FIG. 7. Method 800 may be implemented in the form of executable instructions stored on a machine-readable storage medium and executed by a single processor or a plurality of processors of the apparatus 100, and/or in the form of any electronic circuitry, for example digital and/or analog ASIC. In some implementations of the present disclosure, method 800 may include more or less blocks than are shown in FIG. 8. In some implementations, one or more of the blocks of method 800 may, at certain times, be ongoing and/or may repeat.

The method 800 may start at block 810, and continue to block 820, where a controller (e.g., controller 130 from FIG. 1) may receive printing instructions (e.g., printing instructions 140 from FIG. 1) to print a 3D object by using a build material layer, wherein the printing instructions define an area to be fused in the build material layer. At block 830, a build material distributor (e.g., build material distributor 110 from FIG. 1) forms the build material layer wherein the build material has a color. At block 840, a preheating source (e.g., preheating source 120 from FIG. 1) preheats a zone comprising the area to be fused by emitting energy at a wavelength related to the build material color so that at least 40% of the energy is absorbed by the build material. At block 850, a fusing distributor (e.g., fusing distributor 570 from FIG. 5) ejects fusing agent to the build material layer based on the printing instructions. At block 860, a fusing lamp (e.g., fusing lamp 580 from FIG. 8) heats the build material layer to fuse those portions of the layer on which fusing agent was deposited by raising the temperature of the dyed build material above its melting point. At block 870, the method 800 may end. Method 800 may be repeated multiple times to build the 3D object, each time being printed a subsequent layer.

Figure 9:
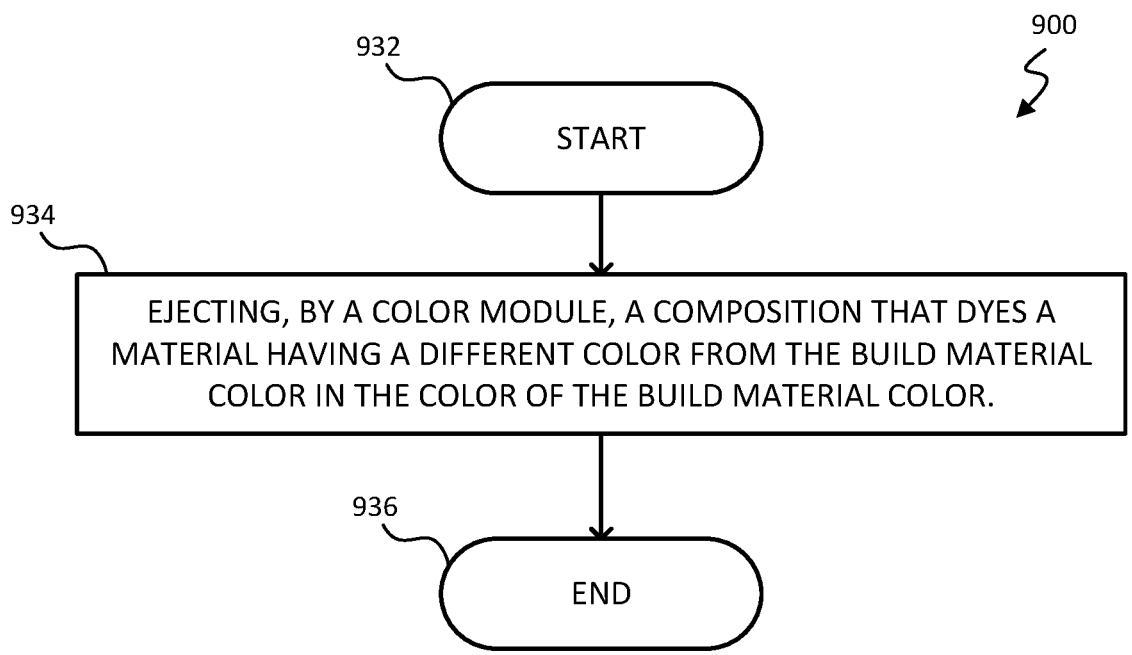
FIG. 9 is a flowchart of another example method for preheating build materials with preheating sources.

FIG. 9 is a flowchart of another example method 900 for preheating build materials with preheating sources according to an example. Method 900 may be a sub-method from method 800 of FIG. 8 by adding an additional block, for example after block 830. In an example, the method 900 may be used in the event the build material powder is a non-dyed build material powder. Method 900 may be described below as being executed or performed by an apparatus, such as apparatus 100 of FIG. 1. Various other suitable systems may be used as well, such as, for example apparatus 400 of FIG. 4, apparatus 500 of FIG. 5, apparatus 600 from FIG. 6, and apparatus 700 from FIG. 7. Method 900 may be implemented in the form of executable instructions stored on a machine-readable storage medium and executed by a single processor or a plurality of processors of the apparatus 100, and/or in the form of any electronic circuitry, for example digital and/or analog ASIC. In some implementations of the present disclosure, method 900 may include more or less blocks than are shown in FIG. 9. In some implementations, one or more of the blocks of method 900 may, at certain times, be ongoing and/or may repeat.

The method 900 may start at block 932, and continue to block 934, where a color module (e.g., color module 460 from FIG. 4) may eject a composition that dyes the build material layer in a color that absorbs at least the 40% if the wavelength energy emitted by the preheating source 420. At block 936, the method 900 may end.

Figure 10:
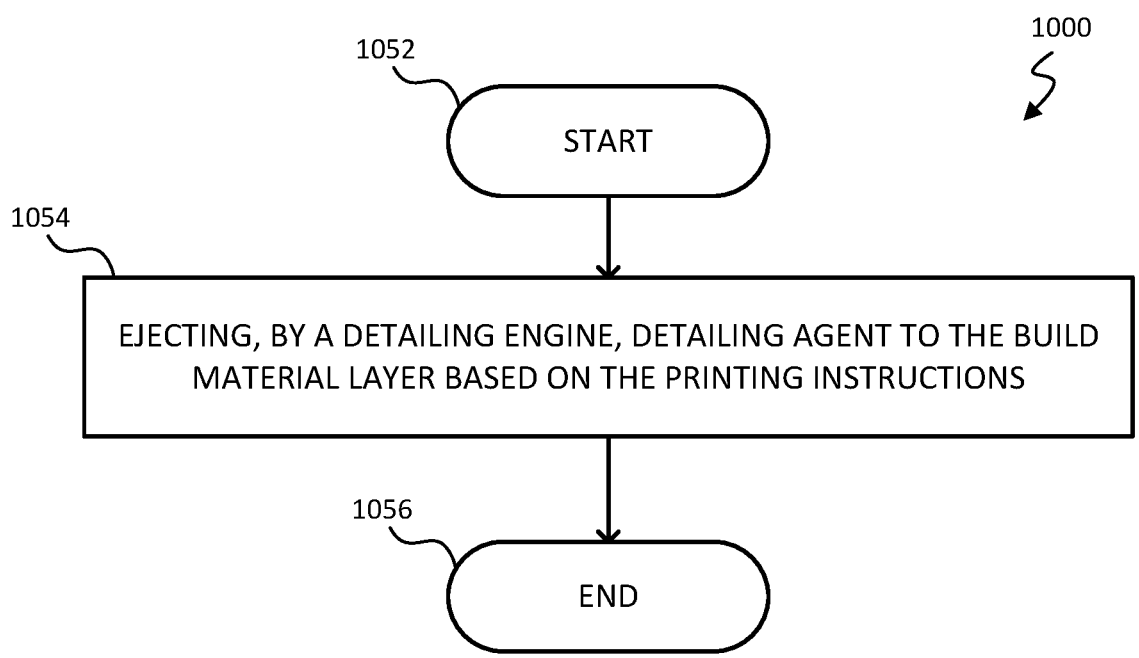
FIG. 10 is a flowchart of another example method for preheating build materials with preheating sources.

FIG. 10 is a flowchart of another example method 1000 for preheating build materials with preheating sources according to an example. Method 1000 may be a sub-method from method 800 of FIG. 8 by adding an additional block, for example after block 850. Method 1000 may be described below as being executed or performed by an apparatus, such as apparatus 100 of FIG. 1, Various other suitable systems may be used as well, such as, for example apparatus 400 of FIG. 4, apparatus 500 of FIG. 5, apparatus 600 from FIG. 6, and apparatus 700 from FIG. 7. Method 1000 may be implemented in the form of executable instructions stored on a machine-readable storage medium and executed by a single processor or a plurality of processors of the apparatus 100, and/or in the form of any electronic circuitry, for example digital and/or analog ASIC. In some implementations of the present disclosure, method 1000 may include more or less blocks than are shown in FIG. 10. In some implementations, one or more of the blocks of method 1000 may, at certain times, be ongoing and/or may repeat.

The method 1000 may start at block 1052, and continue to block 1054, where a detailing engine (e.g., detailing engine 690 from FIG. 6) ejects detailing agent to the build material layer based on the printing instructions (e.g., printing instructions 640 from FIG. 6). At block 1056, the method 900 may end.

Figure 11:
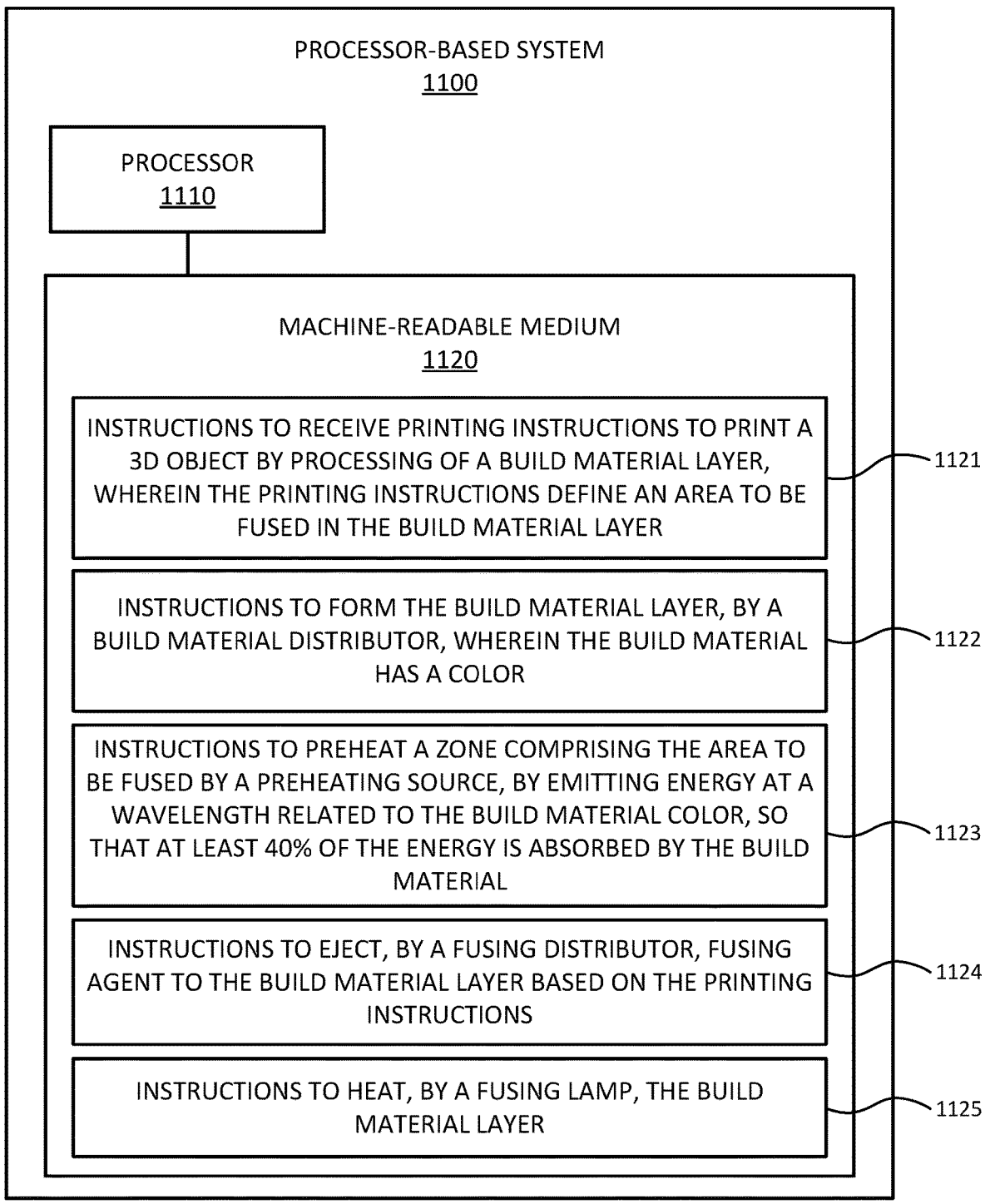
FIG. 11 is a block diagram illustrating an example of a processor-based system to preheat build materials with preheating sources.

FIG. 11 is a block diagram illustrating an example of a processor-based system 1100 to preheat build materials with a light emitting diode array. In some implementations, the system 1100 may be or may form part of a printing device, such as an additive manufacturing system. In some implementations, the system 1000 is a processor-based system and may include a processor 1110 coupled to a machine-readable medium 1120. The processor 1110 may include a single-core processor, a multi-core processor, an application-specific integrated circuit (ASIC), a field programmable gate array (FPGA), and/or any other hardware device suitable for retrieval and/or execution of instructions from the machine-readable medium 1120 (e.g., instructions 1121, 1122, 1123, 1124, and 1125) to perform functions related to various examples. Additionally, or alternatively, the processor 1110 may include electronic circuitry for performing the functionality described herein, including the functionality of instructions 1121, 1122, 1123, 1124, and/or 1125. With respect of the executable instructions represented as boxes in FIG. 11, it should be understood that part or all of the executable instructions and/or electronic circuits included within one box may, in alternative implementations, be included in a different box shown in the figures or in a different box not shown.

The machine-readable medium 1120 may be any medium suitable for storing executable instructions, such as a random-access memory (RAM), electrically erasable programmable read-only memory (EEPROM), flash memory, hard disk drives, optical disks, and the like. In some example implementations, the machine-readable medium 1120 may be a tangible, non-transitory medium, where the term "non-transitory" does not encompass transitory propagating signals. The machine-readable medium 1120 may be disposed within the processor-based system 1100, as shown in FIG. 11, in which case the executable instructions may be deemed "installed" on the system 1100. Alternatively, the machine-readable medium 1120 may be a portable (e.g., external) storage medium, for example, that allows system 1100 to remotely execute the instructions or download the instructions from the storage medium. In this case, the executable instructions may be part of an "installation package". As described further herein below, the machine-readable medium may be encoded with a set of executable instructions 1121-1125.

Instructions 1121, when executed by the processor 1110, may receive printing instructions (e.g., printing instructions 140 from FIG. 1) to print a 3D object by using a build material layer, wherein the printing instructions define an area to be fused in the build material layer. Instructions 1122, when executed by the processor 1110, may form the build material layer, by a build material distributor (build material distributor 110 from FIG. 1), wherein the build material has a color. Instructions 1123, when executed by the processor 1110, may cause the processor 1110 to preheat a zone comprising the area to be fused by a preheating source (e.g., preheating source 120 from FIG. 1), by emitting energy at a wavelength related to the intended build material color, so that at least 40% of the energy is absorbed by the build material. Instructions 1124, when executed by the processor 1110, may cause the processor 1110 to eject, by a fusing agent distributor (e.g., fusing agent distributor 570 from FIG. 5), fusing agent to the build material layer based on the printing instructions. Instructions 1125, when executed by the processor 1110, may cause the processor 1125 to heat, by a fusing lamp (e.g., fusing lamp 580 from FIG. 5), the build material layer to fuse those portions of the layer on which fusing agent was deposited by raising the temperature of the dyed build material above its melting point.

The machine-readable medium 1120 may include further instructions. For example, instructions that when executed by the processor 1110, may cause the processor 1110 to eject, by a color module (e.g., color module 460 from FIG. 4), a composition that dyes the build material layer in a color that absorbs at least the 40% if the wavelength energy emitted by the preheating source.

The machine-readable medium 1120 may include further instructions. For example, instructions that when executed by the processor 1110, may cause the processor 1110 to eject, by a detailing engine (e.g., detailing engine 690 from FIG. 6), detailing agent to the build material layer based on the printing instructions.

The above examples may be implemented by hardware, or software in combination with hardware. For example, the various methods, processes and functional modules described herein may be implemented by a physical processor (the term processor is to be implemented broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processors, or a combination thereof.

The drawings in the examples of the present disclosure are some examples. It should be noted that some units and functions of the procedure are not necessarily essential for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

What it is claimed is:

1. An additive manufacturing system comprising:
    a build material distributor to form build material layers from an intended build material having a build material color;
    a preheating source to emit energy having a wavelength related to the build material color so that at least a 40% of the energy is absorbed by the intended build material;
    a controller to:
        receive printing instructions to print a three-dimensional (3D) object, the printing instructions defining an area to be fused in a build material layer,
        instruct the build material distributor to form the build material layer, and
        control the preheating source to emit the energy to preheat a zone of the build material layer including the area to be fused;
    a fusing distributor to eject fusing agent to the build material layer based on the printing instructions;
    a fusing lamp to heat the build material layer; and
    a detailing agent engine to eject detailing agent to the build material layer based on the printing instructions.

2. The additive manufacturing system of claim 1, wherein the build material layer is formed from a material having a second color, the second color different from the build material color, the additive manufacturing system further including:
    a color module, wherein the controller is to instruct the color module to eject a composition in the build material layer to dye the build material layer a color corresponding to the build material color.

3. The additive manufacturing system of claim 2, wherein the color module includes a print head to jet the composition to the build material layer.

4. The additive manufacturing system of claim 1, wherein the printing instructions are derived from a 3D object model.

5. The additive manufacturing system of claim 1, wherein the preheating source is a two-dimensional Light-Emitting Diode (LED) array including one or more LED lights to emit energy that spans substantially a full width and length of the build material layer and each individual LED light is controllable to emit energy to the area to be fused.

6. The additive manufacturing system of claim 1, wherein the preheating source is a one-dimensional Light-Emitting Diode (LED) array including one or more LED lights to emit energy that spans substantially a full width of the build material layer and is moveable along a length of the build material layer and each individual LED light is controllable to emit energy to the area to be fused.

7. An additive manufacturing system comprising:
a build material distributor to form build material layers from an intended build material having an intended build material color;
a preheating source to emit energy having a wavelength related to the intended build material color so that at least a 40% of the energy is absorbed by the intended build material, the preheating source to emit energy associated with one of blue light or ultraviolet (UV) light, the blue light to emit energy at a wavelength in a range defined from about 450 nanometers (nm) to about 495 nm, the UV light to emit energy at a wavelength of less than 400 nm; and
a controller to:
receive printing instructions to print a three-dimensional (3D) object, the printing instructions defining an area to be fused in a build material layer,
instruct the build material distributor to form the build material layer, and
control the preheating source to emit the energy to preheat a zone of the build material layer including the area to be fused.

8. The additive manufacturing system of claim 7, wherein a color of the build material layer is one of yellow or orange.

9. The additive manufacturing system of claim 1, further including a build material support, wherein the build material layer can be formed on the build material support.

10. The additive manufacturing system of claim 7, further including a fusing module, the fusing module including:
a fusing distributor to eject fusing agent to the build material layer based on the printing instructions; and
a fusing lamp to heat the build material layer.

11. A method comprising:
receiving printing instructions to print a three-dimensional (3D) object by using a build material layer, wherein the printing instructions define an area to be fused in the build material layer;
forming the build material layer from a build material, by a build material distributor, wherein the build material has a build material color;
preheating a zone including the area to be fused by a preheating source, by emitting energy at a wavelength related to the build material color so that at least 40% of the energy is absorbed by the build material;
ejecting, by a fusing distributor, fusing agent to the build material layer based on the printing instructions; and
heating, by a fusing lamp, the build material layer to fuse those portions of the build material layer on which fusing agent was deposited.

12. The method of claim 11, wherein the build material layer is formed from a material having a second color, the second color different from the build material color, and further including:
ejecting in the build material layer, by a color module, a composition that dyes the build material layer a color corresponding to the build material color.

13. The method of claim 11 wherein the preheating by the preheating source includes emitting energy associated with one of blue light or ultraviolet (UV) light, and the build material layer is at least one of yellow or orange, wherein:
the blue light emits energy at a wavelength in a range defined from about 450 nanometers (nm) to about 495 nm, and
the UV light emits energy at a wavelength of less than 400 nm.

14. A non-transitory machine readable medium storing instructions executable by a processor, the non-transitory machine-readable medium comprising:
instructions to receive printing instructions to generate a three-dimensional (3D) object by processing of a build material layer, wherein the printing instructions define an area to be fused in the build material layer;
instructions to form the build material layer from a build material, by a build material distributor, wherein the build material has a predetermined color;
instructions to preheat a zone including the area to be fused by a preheating source, by emitting energy at a wavelength related to the predetermined color, so that at least 40% of the energy is absorbed by the build material;
instructions to eject, by a fusing distributor, fusing agent to the build material layer based on the printing instructions; and
instructions to heat, by a fusing lamp, the build material layer.

15. The additive manufacturing system of claim 11, wherein the preheating source is to emit energy associated with one of blue light or ultraviolet (UV) light.

16. An additive manufacturing system comprising:
a build material distributor to form build material layers from a build material having a color;
a preheating source to emit energy having a wavelength related to the color so that at least a 40% of the energy is absorbed by the build material; and
a controller to:
receive printing instructions to print a three-dimensional (3D) object, the printing instructions defining an area to be fused in a build material layer,
instruct the build material distributor to form the build material layer, the build material layer being yellow or orange, and
control the preheating source to emit the energy to preheat a zone of the build material including the area to be fused, the preheating source to emit energy having the wavelength associated with blue light.

* * * * *